United States Patent [19]

Pageaud et al.

[11] Patent Number: 5,144,523
[45] Date of Patent: Sep. 1, 1992

[54] FOIL CAPACITOR AND METHOD FOR THE MANUFACTURE OF SUCH A CAPACITOR

[75] Inventors: Michel Pageaud; Michel Dautriche, both of Seurre, France

[73] Assignee: Compagnie Europeenne de Composants Electroniques LCC, Courbevoie, France

[21] Appl. No.: 711,871

[22] Filed: Jun. 7, 1991

[30] Foreign Application Priority Data

Jun. 8, 1990 [FR] France ............................ 90 07170

[51] Int. Cl.⁵ .......................... H01G 4/18; H01G 1/14
[52] U.S. Cl. ................................. 361/308; 29/25.42
[58] Field of Search .............. 361/306, 308, 309, 310, 361/311, 312, 313, 303, 304, 305, 273, 323; 29/25.42

[56] References Cited

U.S. PATENT DOCUMENTS 3,549,956 12/1970 Polle .
3,710,211 1/1973 Behn et al. ........................ 361/309
4,226,011 10/1980 Hunt ................................. 29/25.42

FOREIGN PATENT DOCUMENTS 2108715 10/1971 Fed. Rep. of Germany .
1341321 12/1973 United Kingdom .

OTHER PUBLICATIONS

Patent Abstracts of Japan, vol. 013, No. 413 (E820), Sep. 12, 1989, & JP-A-01 152712, Jun. 15, 1989, W. Yasuo, et al., "Formation of External Electrode of Laminated Ceramic Capacitor".

*Primary Examiner*—Donald Griffin
*Attorney, Agent, or Firm*—Oblon, Spivak, McCelland, Maier & Neustadt

[57] ABSTRACT

Disclosed is a foil capacitor made by the stacking of metallized films. The multiple-layer type output plate has intermediate layers made of alloys of the layers that are contiguous to them. Also disclosed is a method for the manufacture of the capacitor, wherein the intermediate layers are formed by the spraying of molten metal.

8 Claims, 1 Drawing Sheet

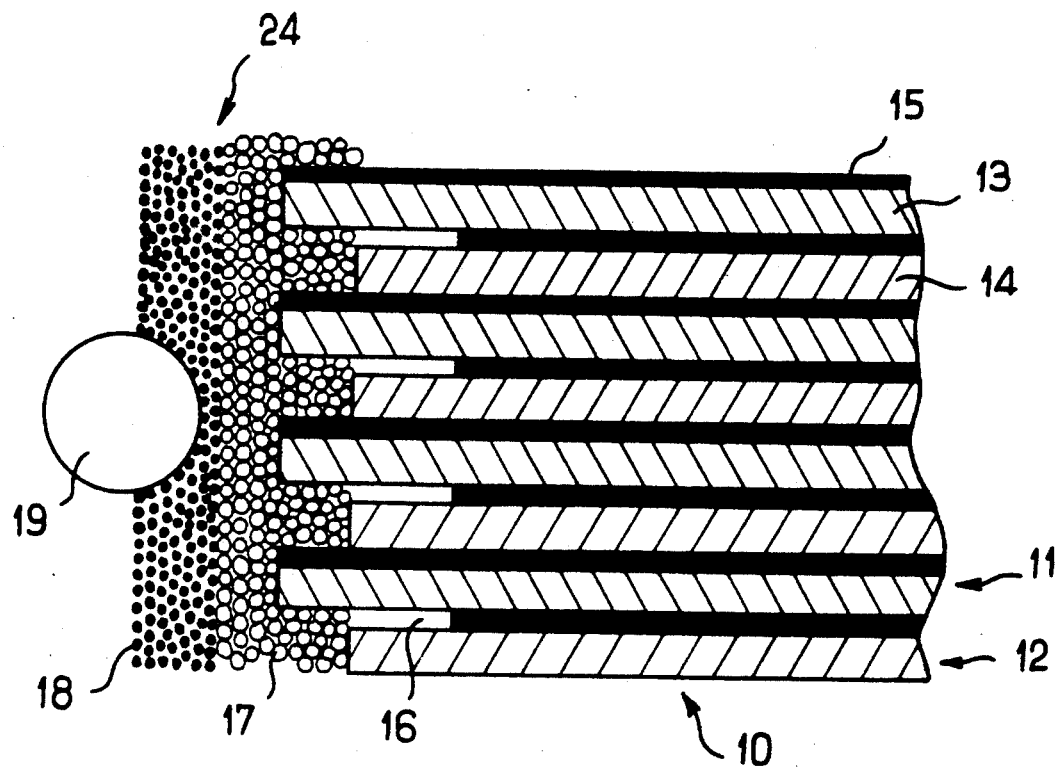
FIG_1
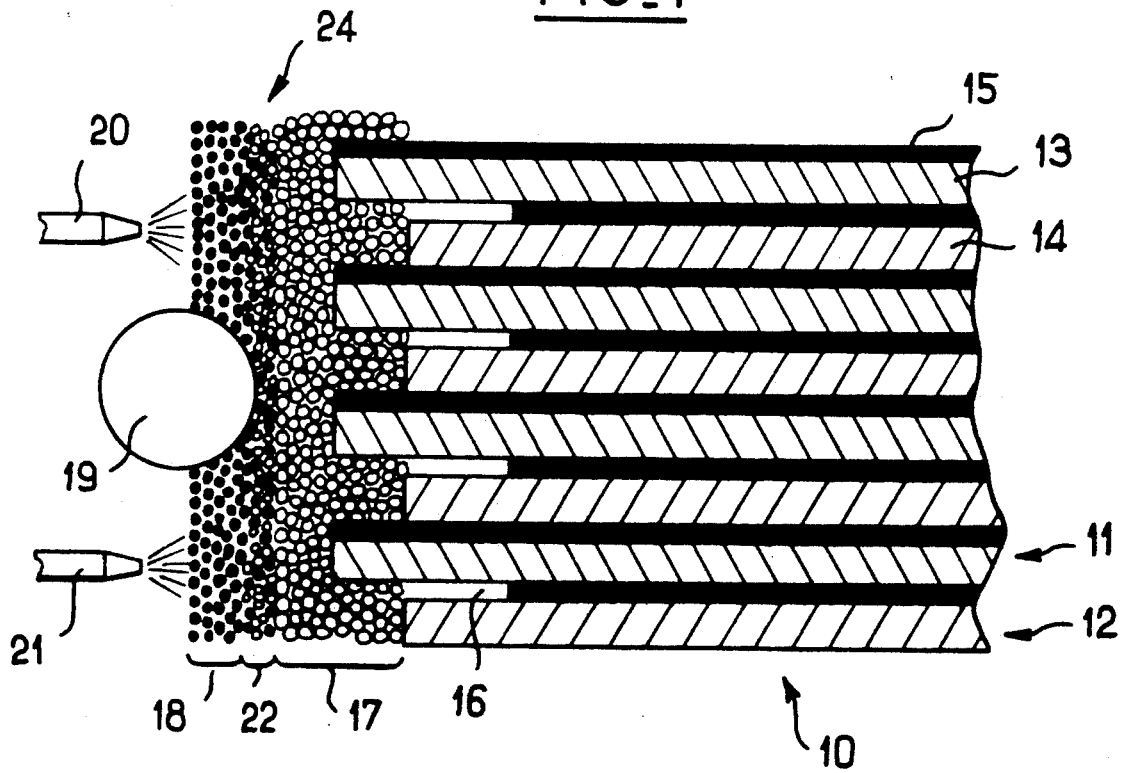
FIG_2

FOIL CAPACITOR AND METHOD FOR THE MANUFACTURE OF SUCH A CAPACITOR

BACKGROUND OF THE INVENTION

1. Field of the Invention

The present invention relates to a foil capacitor of the type comprising a block made by the stacking of capacitor-forming bands, for example metallized plastic films, the bands being appropriately connected mechanically and electrically by two output plates or electrodes, each plate being formed by a succession of metal layers deposited on the opposite flanks of the block.

2. Description of the Prior Art

The manufacture of stacked capacitors out of metallized plastic films is known. Plastic films having a metallized zone and a non-metallized lateral margin are generally used. Two films are superimposed with their non-metallized lateral margins on opposite sides so as to obtain a pair of films constituted by an even-order film and an odd-order film. At least one pair of metallised films is wound in a determined number of turns on a large-diameter wheel.

Thus, a capacitive strip, having alternating even-order and odd-order layers, known as a parent capacitor, is obtained. Each of the flanks of the capacitive strip is then covered with a metal (or alloy) in order to make output plates. Each output plate enables the metallizations of the same order layers to be connected electrically and mechanically to one another. This operation, which is done by the spraying of molten metal, is known as the Schoop's metal-spraying process.

To improve the results of this operation, it is recommended that there be a displacement of the even-order films with respect to the odd-order films, enabling the particles of the Schoop's process to be housed in order to obtain optimum clinging of same-order films. This displacement may be called an offset and is controlled during the operation for winding the films on the large-diameter wheel. Cutting the capacitive strip into blocks makes it possible to obtain distinct capacitors that are generally parallelepiped shaped. They are foil capacitors, and are generally constituted by a stack of alternating odd-order and even-order foils, held between two output plates located on the opposite flanks of the block. Connection elements are then fixed to the output plates of each capacitor.

There is also a known way of making the output plates in the form of a double metal layer having an internal layer adjacent to the metallized films and an external layer, the layers being made of different metal compositions. For, it often proves to be necessary to deposit an external layer, with a metal composition chosen for its excellent soldering properties, on an internal layer with a metal composition chosen for its excellent properties of adhesion, physical and thermal strength and electrical conduction.

However, the difference in the metal compositions used for the two layers of the plates embrittles the interface link between these two layers, notably in the event of quick variations in temperature. For, the layers have different coefficients of linear expansion, whence the appearance of cracks leading to a degradation (by increase) of the effective series resistance (E.S.R.) of the capacitor.

SUMMARY OF THE INVENTION

The invention is aimed at overcoming this drawback and at proposing a capacitor with higher resistance, notably to thermal effects, without in any way thereby increasing its manufacturing cost.

The invention therefore proposes a foil capacitor made by the stacking of metallized bands constituting a block, said bands being appropriately connected mechanically and electrically by output plates located on the lateral walls of the block, wherein each plate is constituted by a succession of an odd number of layers of metal or of metal alloy made independently of one another, each even-order layer being formed by an alloy of the metals or of the metal alloys of the odd-order layers that are contiguous to it.

The presence of the even-order layers of metal alloys according to the invention makes it possible to improve the mechanical tearing-out resistance of the connection leads, for the layers contiguous to them are also strongly linked.

The invention also concerns a method for the manufacture of a capacitor according to the invention, wherein the succession of layers is deposited by the spraying of molten metal, said method comprising the following successive steps when, for example, each plate is constituted by three layers:

spraying of the metal or alloy constituting the internal first-order layer;

simultaneous spraying of the metals or alloys, constituting the two layers, namely the internal and external layer, or spraying of their pre-composed mixture to constitute the intermediate second-order layer;

spraying of the metal or alloy constituting the external third-order layer.

It must be noted that the example of the method according to the invention may be implemented without any particular additional arrangement and even makes it possible to reduce the manufacturing costs resulting from the reduction of the total time taken to deposit the two layers of the plate, the deposition of the intermediate layer being done i masked time.

Advantageously, the cohesion of the two layers of the plate is heightened by increasing the density of the metal or of the alloy sprayed during the phase for constituting the intermediate layer, especially during the simultaneous spraying. According to an additional characteristic, the invention consists in choosing the succession of the metals or metal alloys constituting the odd-order layers in taking account of the linear expansion coefficients of said metals or metal alloys.

Thus, it is advantageous for the metal or metal alloy of a odd-order nth layer to have a linear expansion coefficient with a value ranging from that of the metal or metal alloy of the order $(n-2)$ layer and that of the metal or metal alloy of the order $(n+2)$ layer.

BRIEF DESCRIPTION OF THE DRAWINGS

Other advantages and features of the invention will appear from the following description, given as a non-restrictive example with reference to the appended drawings, of which:

FIG. 1 is a partial sectional view of a part of a capacitor made according to a technique prior to the invention, and FIG. 2 is a partial sectional view of a part of the capacitor according to the invention.

MORE DETAILED DESCRIPTION

The present invention shall be described with reference to an embodiment of plates having three layers. It is clear to those skilled in the art that the invention can be applied to a greater number of layers if necessary.

In FIG. 1, the two active faces 11 and 12 of the capacitor are constituted by a plastic film 13 and 14 made of metallized polyester or of any other material capable of being worked in thin bands (of about some microns) and of being metallized. Advantageously, the metallizations 15 will not entirely cover the face of the films 13 and 14 so as to leave lateral margins 16. For a same film, the margins 16 are located on a same side. The capacitor is assembled in the form of a stacked block 10 so that the odd-order films have their margins located on a same side of the stack, and so that the even-order films have their margins located on the opposite side. By the Schoop's metal-spray process, a molten metal (or alloy) is sprayed on the opposite flanks of the block 10 thus made, notably on the offset parts of the even-order films and odd-order films, in small particles that make electrical contact with the metallized part, thus connecting all the even-order foil (and all the odd-order foils) together by an internal layer 17. The metal of the internal layer 17 generally has the same nature as the metallized part of the films. In order to enable the soldering of the connection lead 19, another metal or alloy, for example a tin-lead alloy, or any other soldering material, is sprayed to make the external layer 18 to which the connection lead 19 will be soldered. The two layers 17 and 18 thus form an output plate 24 for the capacitor. It must be noted that only a part of the left-side plate of the capacitor is shown in FIG. 1. Clearly, an identical plate is deposited on the opposite face (the right-hand face) of the block 10.

The capacitor according to the invention shown in a partial section in FIG. 2 differs from the one shown in FIG. 1 by the existence of an intermediate layer 22 between the two layers 17 and 18 of the plate 24 and is made by the mixing of the metal constituents of the compositions of the two layers. To do this, according to the method of the invention, the following steps of spraying with molten material are carried out successively:

spraying by a gun (or nozzle) 20 of the metal (or alloy) constituting the internal layer 17;
simultaneous spraying by guns (or nozzles) 20, 21 of the metals (or alloys) constituting the two layers 17 and 18;
spraying by the gun (or nozzle) 21 of the metal (or alloy) constituting the external layer 18.

Thus, during the simultaneous spraying, there is formed an intermediate layer where the particles sprayed by the two nozzles are mixed together, imbricated and made to cling together. In a practical way, the blocks 10 file past the nozzles 20 and 21 in the capacitive strip state (before being cut out) so as to achieve a sweeping motion called a pass. As a non-restrictive example, seven "passes" are done to make the internal layer 17, then five simultaneous spraying "passes" to make the intermediate layer 22, and finally seven "passes" to make the external layer 18, all three layers made in this way having a thickness of about 0.4 millimeters. Advantageously, it is possible to reduce the speed with which the capacitive strip files past the nozzles during the simultaneous spraying phase to increase the density of the particles in the transition zone 22 and improve the cohesion of this zone.

Naturally without going beyond the scope of the invention, the mixture constituting the intermediate layer may be prepared beforehand out of the metal compositions chosen for the internal and external layers, and then sprayed by a specific nozzle between the phases for the spraying of the internal and external layers.

The invention can be used with any type of film, whether metallized or not. It can be used, in particular and non-restrictively, with films made of polyester (polyethyleneglycol terephtalate), polycarbonate, polypropylene, polysulfone, etc. For the internal layer 17, the composition in metal constituents will be chosen from among metals and alloys having excellent properties of electric conduction and adhesion with respect to the plastic film used. In particular, and non-restrictively, these metals and alloys may be zinc, aluminium and their alloys For the external layer 18, the composition in metal constituents will be chosen from among metals and alloys having excellent properties of conduction and soldering with the external connection leads. In particular, and non-restrictively, these compositions will include monometallic compositions (tin), binary alloys (zinc/lead, zinc/tin, tin/lead) or ternary alloys (tin/antimony/copper).

What is claimed is:

1. A method for the manufacture of a foil capacitor made by the stacking of metallized bands constituting a block, said bands being appropriately connected mechanically and electrically by output plates located on the lateral walls of the block, wherein each place is constituted by a succession of an odd number of layers of metal or of metal alloy made independently of one another, each even-order layer being formed by an alloy of the metals or of the metal alloys of the odd-order layers that are contiguous to it, comprising the steps of:
   a) spraying a metal or metal alloy constituting the odd numbered layer onto said bands on the lateral walls of said block to form a cast odd numbered layer of said output plates,
   b) spraying a metal or metal alloy constituted of both the odd and even numbered layers of metal or metal alloy onto said first odd numbered layer to form an even numbered layer of said output plates,
   c) spraying a metal or metal alloy constituting the odd numbered layers onto said even numbered layer to form an odd numbered layer of said output plates, and, if necessary, repeating steps b) and c).

2. A method according to claim 1, wherein in step b) the metal or metal alloy of each of the odd and even numbered layer is separately and simultaneously sprayed onto said first odd numbered layer.

3. A method according to claim 1, wherein in step b) a mixture of the metal or metal alloy of the odd and even numbered layers is sprayed onto said first odd numbered layer.

4. A method according to any one of claims 1 to 3, wherein the coefficient of linear expansion of the meal or of the metal alloy constituting each odd-order layer has a value ranging between the values of the coefficients of linear expansion of the two metals or metal alloys constituting the odd-order layers on either side of it.

5. A method according to any one of claims 1 to 3, wherein the capacitor-forming bands are of the metallized plastic film type, wherein the metal constituents of the internal layer are metals or alloys having good properties of electrical conduction and adhesion with respect to said metallized plastic film.

6. A method according to claim 5, wherein said metals or alloys are of zinc, aluminum or their alloys.

7. A method according to any one of claims 1 to 3, wherein the metal constituents of the external layer are metals or alloys having good properties of conduction and soldering with the external connection leads.

8. A method according to claim 7, wherein said metals or alloys are of tin, zinc/lead, zinc/tin, tin/lead or tin/antimony/copper.

* * * * *

UNITED STATES PATENT AND TRADEMARK OFFICE
CERTIFICATE OF CORRECTION

PATENT NO. : 5,144,523
DATED : September 1, 1992
INVENTOR(S) : PAGEAUD ET AL It is certified that error appears in the above-identified patent and that said Letters Patent is hereby corrected as shown below:

Column 2, line 43, after "done" delete "i" and insert --in--.

Column 4, line 61, Claim 4, delete "meal", insert --metal--.

Signed and Sealed this

Thirtieth Day of November, 1993

Attest:

BRUCE LEHMAN

Attesting Officer

Commissioner of Patents and Trademarks